T. M. Corbett,
Seed Dropper.

No. 93,969.  Patented Aug. 24. 1869.

WITNESS.
W. B. Smith
John I. Herrick

INVENTOR.
Thos. M. Corbett

United States Patent Office.

THOMAS M. CORBETT, OF MILWAUKEE, WISCONSIN, ASSIGNOR TO HIMSELF AND JOHN I. HERRICK, OF SAME PLACE.

Letters Patent No. 93,969, dated August 24, 1869.

IMPROVEMENT IN SEEDING-MACHINE.

The Schedule referred to in these Letters Patent and making part of the same.

*To all whom it may concern:*

Be it known that I, THOMAS M. CORBETT, of the city and county of Milwaukee, and State of Wisconsin, have invented a new and useful Improvement in Feeders for Seeding-Machines; and I do hereby declare that the following is a full, clear, and exact description thereof, which will enable those skilled in the art to make and use the same, reference being had to the accompanying drawing, forming part of this specification, in which—

Similar letters of reference in each of the figures indicate corresponding parts.

Figure 1:
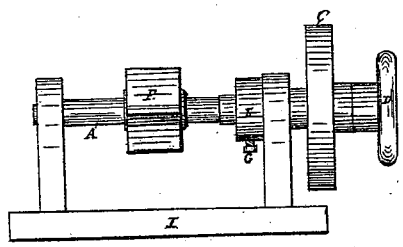
Figure 1 is a side view of my invention.
Figure 2:
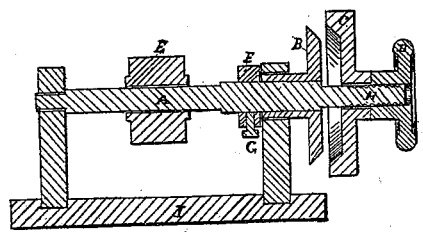
Figure 2 is a sectional view of the same.

The object of my invention is to produce an easy and convenient way by which the seed shall be fed out of a seeding-machine.

A is the shaft.

B is the fixed part of the clutch, which may be of plain, smooth surfaces, or of projections, or of recesses adapted to the other part of the clutch.

C is the loose part of the clutch and pulley (or wheel) with which motion is received from the driving-power, and given to the shaft A.

D is a nut (or its substitute) on the end of shaft A.

E is a shoulder on shaft A.

F is a conveyer or feeder of the seed.

G is a screw which fastens the shoulder E to the shaft A.

H is a screw on the end of shaft A, which the nut D moves on.

I is the frame which holds the works.

This apparatus is for the purpose of coupling the feeding-works to the driving-power of the seeding-machine, so that it may operate or not, as circumstances may require.

When it is desired to put the feeding-works into operation, shove up the loose part of the clutch C, by the nut D, or its substitute, forcing it into contact with the fixed part of the clutch B, and the shaft A will revolve, and, with it, the conveyer F.

The fixed part of the clutch B fits into or against the loose part of the clutch C; and when it is desired to stop feeding the seed, retire the part D, and the loose part of the clutch C will retire on the shaft A.

What I claim as my invention, and desire to secure by Letters Patent, is—

1. A feeding-apparatus, consisting of shaft A, fixed part of clutch B, loose part of clutch C, and feeder or conveyer F, constructed substantially as described.

2. A, B, C, D, and F, arranged substantially as described.

THOS. M. CORBETT.

Witnesses:
 J. B. SMITH,
 J. I. HERRICK.